(12) United States Patent
Sorsavirta et al.

(10) Patent No.: US 9,504,346 B2
(45) Date of Patent: Nov. 29, 2016

(54) DEVICE, SYSTEM AND METHOD FOR DISPENSING MARGARINE, BUTTER OR OTHER BREAD SPREADS

(71) Applicant: Sepima Oy, Naantali (FI)

(72) Inventors: Seppo Sorsavirta, Naantali (FI); Timo Sorsavirta, Naantali (FI)

(73) Assignee: FD Holding Oy, Naantali (FI)

( * ) Notice: Subject to any disclaimer, the term of this patent is extended or adjusted under 35 U.S.C. 154(b) by 0 days.

(21) Appl. No.: 14/405,834

(22) PCT Filed: Jun. 12, 2013

(86) PCT No.: PCT/FI2013/050635
§ 371 (c)(1),
(2) Date: Dec. 5, 2014

(87) PCT Pub. No.: WO2013/186439
PCT Pub. Date: Dec. 19, 2013

(65) Prior Publication Data
US 2015/0297015 A1    Oct. 22, 2015

(30) Foreign Application Priority Data

Jun. 15, 2012  (EP) ................................. 12172099

(51) Int. Cl.
*A47J 9/00* (2006.01)
*B65D 35/28* (2006.01)

(52) U.S. Cl.
CPC *A47J 9/00* (2013.01); *A47J 9/001* (2013.01); *A47J 9/005* (2013.01); *A47J 9/006* (2013.01); *B65D 35/285* (2013.01); *A47J 2009/008* (2013.01)

(58) Field of Classification Search
CPC ...... A47J 2009/008; A47J 9/00; A47J 9/001; A47J 9/005; A47J 9/006; B65D 35/285
See application file for complete search history.

(56) References Cited

U.S. PATENT DOCUMENTS

| | | | | |
|---|---|---|---|---|
| 2,529,850 A | | 11/1950 | Scharsch | 31/6 |
| 3,233,784 A | * | 2/1966 | Gordon | B65D 35/285 222/102 |
| 3,581,943 A | * | 6/1971 | Koenigshof | B65D 35/285 222/102 |
| 3,701,459 A | * | 10/1972 | Ward | B65D 35/285 222/102 |
| 3,815,787 A | | 6/1974 | Spies | 222/95 |
| 3,904,079 A | * | 9/1975 | Kross | B67D 1/0041 222/108 |

(Continued)

FOREIGN PATENT DOCUMENTS

| | | |
|---|---|---|
| EP | 1358115 | 11/2003 |
| GB | 1269198 | 4/1972 |
| GB | 2304825 | 3/1997 |

*Primary Examiner* — Kevin P Shaver
*Assistant Examiner* — Bob Zadeh
(74) *Attorney, Agent, or Firm* — James C. Lydon (57) ABSTRACT

A device, a system and a method for dispensing butter, margarine or other bread spreads in small portions. The device includes a housing, components for arranging a package in a removable manner inside the housing, a dispensing opening, and a device located at the dispensing opening for stopping the flow of dispensed material. The device further includes pressing components between or through which the package is arranged to travel in order to press against the package's outer surface, and a rotable axle shaft adapted to receive a second end of the package and to move the package between or through the pressing components. A first end of the package is arranged in connection with the dispensing opening.

12 Claims, 4 Drawing Sheets

(56) References Cited

U.S. PATENT DOCUMENTS

| | | | | |
|---|---|---|---|---|
| 4,627,551 A | * | 12/1986 | Kopp | B65D 35/285 |
| | | | | 222/1 |
| 5,485,940 A | * | 1/1996 | Hernandez | A47J 47/12 |
| | | | | 221/192 |
| 5,511,696 A | * | 4/1996 | Gustafson | B65D 35/285 |
| | | | | 222/102 |
| 6,196,420 B1 | * | 3/2001 | Gutierrez | B67D 7/0216 |
| | | | | 222/101 |
| 6,691,894 B2 | * | 2/2004 | Chrisman | B67D 7/0216 |
| | | | | 222/101 |
| 2008/0100441 A1 | * | 5/2008 | Prodanovich | G08B 21/245 |
| | | | | 340/572.1 |
| 2009/0065520 A1 | * | 3/2009 | Peters | B67D 1/0041 |
| | | | | 221/1 |
| 2015/0297015 A1 | * | 10/2015 | Sorsavirta | A47J 9/001 |
| | | | | 222/1 |

* cited by examiner

DEVICE, SYSTEM AND METHOD FOR DISPENSING MARGARINE, BUTTER OR OTHER BREAD SPREADS

FIELD OF THE INVENTION

The present invention relates to a device, a system and a method for dispensing margarine, butter or other bread spreads according to the preambles of the independent claims presented below.

BACKGROUND OF THE INVENTION

Typically margarine, butter or other bread spreads are on offer by means of a normal margarine packet with a knife at breakfast and buffet tables in hotels, restaurants, canteens and corresponding places. The problem relating to these open packets is that they are visually unattractive, and even unhygienic. In addition, the quality of the margarine decreases during the serving because of an interference of the cooling of the product.

Another typical way to offer spreadable fats, jams, marmalade or other bread spreads is to provide pre-packet portions, which are a more hygienic solution. However, this solution is not environmentally friendly due to the huge amount of waste from the packages.

Some automatic devices have been developed for dispensing butter or margarine in small portions, e.g. patent publication EP1358115. However, the problem relating to this kind of automatic dispensing devices is that they comprise a lot of elements which have to be detached from the device when the device is loaded with the substance to be dispensed. These elements must also be cleaned by hand before being reinstalled into the device. In addition, the filling of the container of the device with the butter or margarine has to be done by hand, which is time-consuming and even unhygienic.

SUMMARY OF THE INVENTION

It is an object of the present invention to reduce or even eliminate the above-mentioned problems appearing in prior art.

The aim of the invention is to provide a device and a system for dispensing margarine, butter or any other edible and spreadable substances in small portions, which device and system make possible a hygienic dispensing of the substance.

It is especially an object of the present invention to provide a system for dispensing a bread spread, which system reduces or even eliminates the necessity to detach and clean the elements of the dispensing device between the fillings. Thus, one object of the invention is to provide a system, which speeds up the filling of the device by using ready-made product packages.

Another object of the present invention is to provide a computer-controlled system for dispensing bread spread, which system provides easy change from one substance to another, so that the portion size is optimal for the substance to be dispensed.

In order to achieve among others the objects presented above, the invention is characterized by what is presented in the characterizing part of the enclosed independent claims.

Some preferred embodiments of the invention will be described in the other claims.

The embodiments and advantages mentioned in this text relate, where applicable, both to the device and the system as well as to the method according to the invention, even though it is not always specifically mentioned.

A typical device according to the invention for dispensing margarine, butter or other bread spreads in small portions comprises at least
- a housing,
- means for arranging a package, which comprises margarine, butter or other spread, in a removable manner within the housing,
- a dispensing opening,
- cutting means arranged at the dispensing opening, and the device further comprises means for pressing the package from its outer surface, which pressing means comprise
- at least one axle shaft, which is arranged in connection with an end of the package, or
- pressing components, through which the package is arranged to travel.

A typical system according to the invention for dispensing margarine, butter or other bread spreads in small portions comprises at least
- a device according to the invention, and
- a package, which comprises a product to be dispensed, and which package has been arranged in removable manner within the housing of the device.

A typical method according to the invention for dispensing margarine, butter or other bread spreads in small portions, which method comprises at least the following steps
- arranging a package, which comprises a product to be dispensed, in a removable manner within the dispensing device according to the invention,
- determining the product packed in the package,
- adjusting portion size on the basis of the product, and
- dispensing the product by opening and closing the dispensing opening of the device and compressing the package by means of the pressing means of the device.

The present invention is based on that a product to be dispensed has been packed in a ready-made package, which can be arranged within a housing of the dispensing device, and so the product can be dispensed from the package in small portions by means of the device, so that the only parts of the device which are in contact with the product to be dispensed are the dispensing opening and the cutting means of the device. In other words, the device of the invention itself does not comprise any container which has to be filled up, but the separate ready-made margarine or other spread package unit is arranged inside the device, whereby the system according to the invention makes the dispensing of the bread spreads more simple and hygienic. In addition, there is no need for detaching and cleaning several parts of the dispensing device, because the pressing of the package has been carried out from the outer surface of the package, whereby the pressing means of the device are not in contact with the product to be dispensed. The dosage of the product is based on the compression of the package, wherein the package is pressed from its outer surface and there is always package material between the product and the pressing means.

A bread spread or edible substance or product mentioned in this text refers to any food that is spreadable, generally with a knife, onto bread, crackers, or other food products. Common spreads include dairy spreads (e.g. butters, cheeses and creams), vegetable spreads (e.g. jams, jellies, peanut butter), margarines and honey. Thus, the spread refers to all suitable edible paste-like substances which can be dispensed in small portions.

The dispensing device and the system according to the invention have been developed for helping the dosage of bread spreads e.g. at breakfast and buffet tables in hotels, restaurants, canteens and corresponding places, which places have a need to dispense a huge amount of bread spread products in small portions. The system according to the invention provides a more hygienic and more cost-efficient method for dispensing margarine in these places and also provides savings in packing material, whereby the amount of the waste can be remarkable reduced.

The device according to the invention comprises a housing and means for arranging a package in a removable manner within the housing. The package having a first end and a second end can be arranged inside the device in different ways so that at least a part of the first end of the package is arranged in connection with the dispensing opening of the device, and the second end of the package is also attached with some mechanism in its place. Typically, the second end is attached in connection with the means for pressing the package when the package is installed inside the device. In a preferred embodiment of the invention, the lower end of the package has been arranged in connection with the dispensing opening, and the upper end of the package is attached in connection with the pressing means.

In an embodiment of the invention, the means for arranging a package within the housing of the device comprise a support frame, in which frame the package is arranged in a removable manner, and which support frame is in close contact with an outer surface of the package. In an embodiment of the invention, the height of the support frame is substantially the same as the height of the package and it substantially surrounds the whole package except for possible openings which are needed for the pressing means. Typically, the support frame also comprises a bottom part, which supports the lower end of the package; the bottom part comprises typically a dispensing opening. In an embodiment of the invention the support frame can be opened so that the package can be easily arranged in the support frame. The aim of the support frame is to support the package, wherefore the support frame has been dimensioned so that it sets closely around the package. Another aim of the support frame is to form a surface which makes possible the cooling and/or heating of the product. The support frame is typically made of metal, e.g. stainless steel.

The support frame is not an essential element, if the package itself is so firm that it maintains its shape, i.e. the package is a so-called self-standing package, in which case the package can be arranged within the housing only with the means arranged in an end of the package or both ends of the package.

In a preferred embodiment of the invention, the device further comprises means for adjusting temperature, i.e. means for cooling and/or heating the product to be dispensed. Typically, the device comprises means for cooling the product. In a preferred embodiment of the invention, the means for adjusting temperature comprise at least one Peltier element. In an embodiment of the invention, the Peltier element is arranged in contact with the support frame, in which support frame the package is arranged. In another embodiment of the invention, the Peltier element is arranged within the device so that the cooled/heated air from the Peltier element is led into contact with the support frame or the package itself by means of a fan/fans.

The device of the invention also comprises pressing means by which means the package is pressed from its outer surface so that the package is compressed, when the product is pressed out from the package. By means of the pressing means margarine or other spread is dispensed from the device in desirable portions. The moving of the pressing means is controlled and it can be adjusted so that the desired portion can be dispensed. The compression of the package is carried out from the outer surface of the package, so the pressing means are not inside the package in any step of the dosage of the product. Thus, the pressing means have been arranged within the device, so that they are not in contact with the product or substance to be dispensed.

In an embodiment of the device according to the invention, the means for pressing the package within the housing comprise at least one axle shaft, a rod or the like, which has been arranged in connection with one end of the package. The axle shaft can comprise a groove or the like in which the package can be fastened, so the axle shaft also comprises means for arranging the package within the housing. The axle shaft or rod is used to compress the package for dispensing the product from the package, i.e. the package is rolled up around the axle shaft in order to press the package. The empty package is rolled up around the axle shaft and the product to be dispensed is moved in front of the axle shaft toward the dispensing opening.

In another embodiment of the invention, the means for pressing the package comprise pressing components, through which the package is arranged to travel. Typically, the pressing components comprise
    at least two rollers arranged towards to each other so that the package is arranged to travel between the rollers, or
    a guiding plate having a groove, through which groove the package is arranged to travel.

The pressing components press the package when the package is guided to travel through the pressing components, i.e. the product to be dispensed is moved in front of the pressing components toward the dispensing opening.

In a preferred embodiment of the invention, the device further comprises means for moving the package in combination with the pressing components in order that the package can be moved through the pressing components. In an embodiment of the invention the means for moving the package comprise the axle shaft or the like. The pressing components are typically arranged underneath the axle shaft. The package is arranged to travel through the pressing components and simultaneously the empty package is rolled around the axle shaft. By this method, the package can be emptied evenly. In a preferred embodiment of the invention the pressing components arranged underneath the axle shaft in a height direction of the device comprise at least two rollers arranged towards to each other so that the package is arranged to travel between the rollers. The moving means in combination with the pressing components can also be any other mechanism by which the package can be conveyed to travel through the pressing components so that the empty package can be moved away from the pressing components.

In one embodiment of the invention, the means for pressing a package comprise only pressing components, such as at least two rollers or the like, arranged towards to each other so that the package of the invention is arranged to travel between the rollers. By means of the rollers, the package is emptied by so-called mangle method.

The pressing means can be arranged within the housing in a horizontal or a vertical direction depending on the structure of the dispensing device. The pressing means are typically arranged in the housing substantially perpendicular to the height direction of the housing of the device. In another embodiment of the invention, the pressing means are arranged in connection with the package so that the pressing means are parallel to the height direction of the housing.

In an embodiment of the device according to the invention, the means for pressing a package further comprise guide rails or the like arranged within the housing, which guide rails are arranged in connection with the ends of the axle shaft, pressing components or an arrangement comprising the pressing means so that they can be moved along the guide rails for compressing the package. Typically, the guide rails are arranged in both sides of the package within the housing, and they have been arranged within the housing in the height direction of the housing. Typically, the length of the axle shaft or pressing components is greater than the width of the end of the package, in order for the ends of them to be arranged in connection with guide rails arranged in the edges of the housing of the device.

Typically, the guide rails are substantially vertical bars which make it possible to move the pressing means backwards and forwards within the housing of the device, when the package is pressed for dispensing the substance from the package. In another embodiment of the invention, the pressing means are e.g. belt-driven, wheel-driven or the like.

In a preferred embodiment of the invention, the housing and the guide rails have been arranged in the vertical direction, whereby the pressing means are moved downwards and upwards along the guide rails. In this embodiment, the margarine or other spread package is pressed so that the pressing means are moved downwards along the guide rails. The pressing means can be moved downwards by gravitational force or they can be driven by a stepper motor. The pressing means can also be operated e.g. pneumatically. When the package is empty and the pressing means have been moved close to the lowest end of the guide rails, the pressing means are driven back to the upper end of the guide rails so that the empty package can be removed from the housing and the new package can be installed to the device.

In a preferred embodiment of the invention, the pressing of the package is carried out from the upper end of the package in the height direction of the housing of the device. Alternatively, the pressing can be carried out from the longitudinal side of the package.

In an embodiment of the invention, the axle shaft for moving the package is rotated by the stepper motor and the rollers used as the pressing components are rotated by gravitational force.

The package, in which the product to be dispensed is packed, is typically made of plastic, foil or the like, and it comprises an outer shell, and a first and a second end. The package can be formed to be cylindrical or a sausage or tube like package. In a preferred embodiment the package is a self-standing package, which comprises two side walls having a first end and a second end and a base wall, which is connected between the first ends of two side walls. Typically, the base wall comprises a ready-made opening, which can be arranged in connection with the dispensing opening of the device. The material of the package can be any suitable material for packing the substance to be dispensed and for withstanding the pressing of the package from its outer surface. Typically, the thickness of the packing material is about 0.02 mm-0.5 mm, more typically about 0.05 mm, whereby the thickness of the package does not affect the controlling of the pressing means. For example, when the package is rolled around the axle shaft, the effect of the package to the rotation parameters for dispensing the desired portion is minimal.

In an embodiment of the invention, the package can further comprise support elements arranged in contact with a surface of the outer shell of the package. The purpose of these support elements is that the package maintains its shape and thereby can be easily installed inside the dispensing device.

A package according to the invention can be manufactured in different dimensions depending on the dispensing device. Typically, the length of the package in the longitudinal direction is 100-300 mm, more typically 120-200 mm, and most typically 150-180 mm. The diameter of the package is typically 80-150 mm, and more typically 100-120 mm.

The seams of the package are typically heat sealed. In an embodiment of the invention the ends of the package comprise packing material in excess, i.e. the package is not closed in the end of the package but there is a short piece of not-filled packing material in the ends of the package, which ease the attaching of the package within the housing. In an embodiment of the invention, the ends of the package can comprise e.g. holes or hooks or the like, which prepare the way for fastening the package to the means for arranging the package within the device.

Typically, a dispensing opening is arranged in the lowest part of the housing in which the package is arranged, so that bread or a plate can be arranged below it. The dispensing opening can be in the bottom of the housing part or in the lowest part of a side wall of the housing part. Typically, the package has been arranged within the device so that the dispensing opening is in connection with the lower end of the package. In an embodiment of the invention, the dispensing opening comprises a separate nozzle which has been fastened to the dispensing opening by using quick clamping.

Cutting means have been arranged in connection with the dispensing opening in the device of the invention. In an embodiment of the invention, the cutting means have been arranged below the dispensing opening. Typically, the cutting means are also used to open and close the dispensing opening and so separate closing means do not need to be arranged at the dispensing opening. In other words, the cutting means have been arranged so that they close the dispensing opening, and when the margarine or other spread is dispensed, the cutting means are moved for opening the dispensing opening, and when the required portion has been dispensed the cutting means are moved back to the close position simultaneously cutting the flow of the dispensed substance. Therefore, the cutting means are also arranged in data connection with the pressing means. The cutting means can be e.g. a blade, a wire or the like, which makes it possible to easily cut the flow of the substance to be dispensed.

In an embodiment of the invention, the cutting means are driven with magnets. Typically, the cutting means are made of stainless steel and they are attached to the housing by using quick-action coupling in order to be easily cleaned, since the cutting means are typically the only part of the device of the invention which is in connection with the substance to be dispensed.

In an embodiment of the invention, the device further comprises a photocell arranged close by the dispensing opening. By means of the photocell the function of the dispensing opening and the cutting means is controlled.

In an embodiment of the invention, the device also comprises a blade or a spike, which has been arranged in close contact with the dispensing opening for arranging a hole in the package arranged within the housing, so that the package can be opened only after it has been arranged in its place. The package is opened in the point which is in the area of the dispensing opening. Alternatively, the package can comprise a ready-made opening closed with a cork or the like.

The device according to an embodiment of the invention can comprise an arrangement for one or more bread spreads.

In an embodiment of the invention, the device further comprises means for dispensing a slice of bread. Typically, these means comprise one or more containers for slices of bread and means for arranging a slice of bread, e.g. below the dispensing opening of the device.

The system according to the invention typically comprises a controlling system and a computer program which makes possible a controlling of an adjusting of the device. In an embodiment of the invention, the device is remote controlled. For example control and adjustment of the required portion size or changing of information and/or advertisements showed on the display can be carried out by using controlling system of the device. They can also be remote controlled via operating system of the device. The device according to an embodiment of the invention comprises a computer program product, comprising machine-readable instructions that, when executed in a processor, cause the implementation of a method that comprises e.g. identification of the product to be dispensed, adjustment of the parameters of the device on the basis of the product, controlling the dosing and/or determining a desired information on the display of the device.

In an embodiment of the invention, the package arranged within the device comprises an RFID identifier, a bar code or any other identifier and the device comprises a reader of the identifier. In this way, the product to be dispensed can be determined and product information can easily be identified, whereby for example the parameters of the dispensing device can be reset on the basis of the product information. In an embodiment of the invention, the portion size of the substance to be dispensed is changed or adjusted on the basis of the information included in the identifier of the package. In a preferred embodiment of the invention, the moving of the pressing means is adjusted on the basis of the product data. On the basis of this product information also the best before date can be checked and in an embodiment of the invention the dispensing device can be controlled so that after the best before date the product cannot be dispensed any more.

In an embodiment of the invention, the system further comprises a display for showing e.g. product specification, nutritional values of the dispensed product, advertisements or any other desired information. The presentation on the display can be remote-controlled by means of the device's controlling system. For example, the product details can be changed by the information included in the identifier attached to the package.

A typical method according to the invention for dispensing margarine, butter or other bread spreads in small portions comprises the following steps:
- arranging a package in its place within the dispensing device so that a first end of the package is arranged in connection with a dispensing opening of the device,
- opening the package in the area of the dispensing opening or opening the cork of the package,
- compressing the package by means of pressing means when the dispensing opening is open,
- cutting the flow of the bread spread and closing the dispensing opening by means of the cutting means arranged at the dispensing opening.

In a preferred embodiment of the invention, the package is arranged within the device so that the pressing means are arranged to be in contact with the upper end of the package and the lowest end of the package is in contact with the dispensing opening. In a preferred embodiment of the invention, the product is also cooled in the device.

DESCRIPTION OF THE DRAWINGS

The invention will be described in more detail with reference to appended drawings, in which.

DETAILED DESCRIPTION OF THE INVENTION

Figure 1:
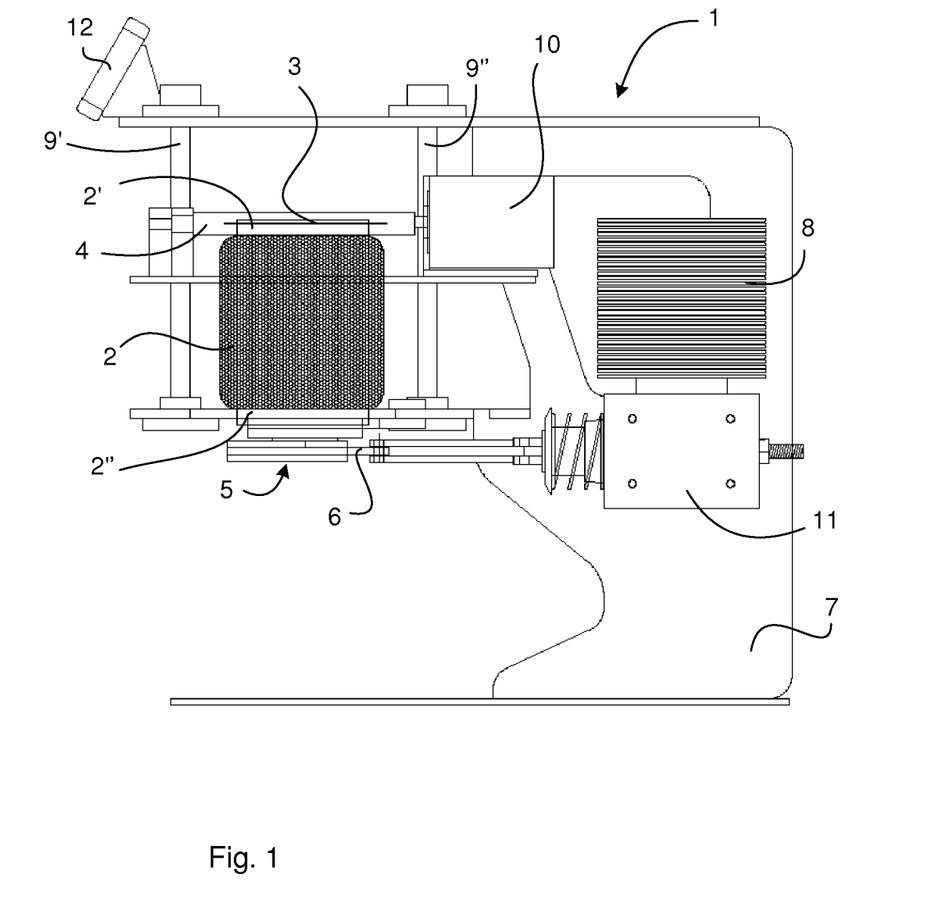
FIG. 1 shows a cross section of a device according to an embodiment of the invention.
Figure 2:
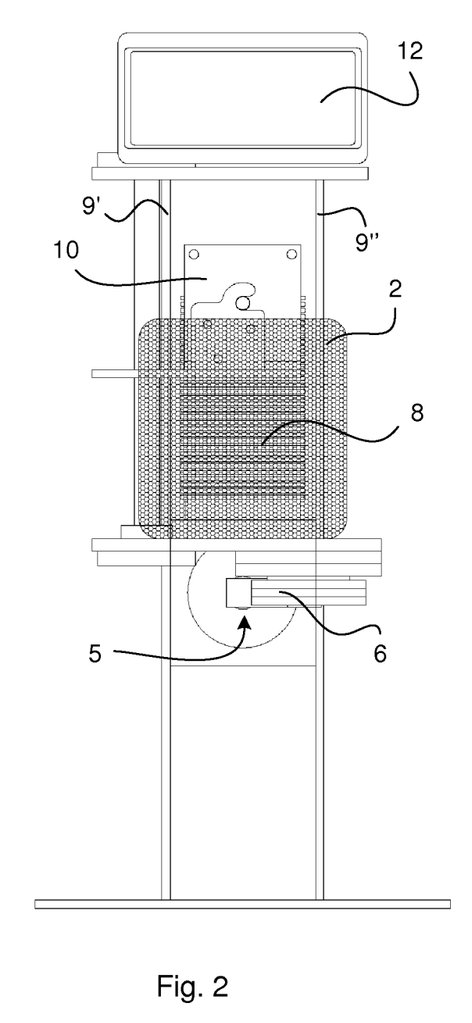
FIG. 2 shows a front view of the device according to an embodiment of the invention.
Figure 3:
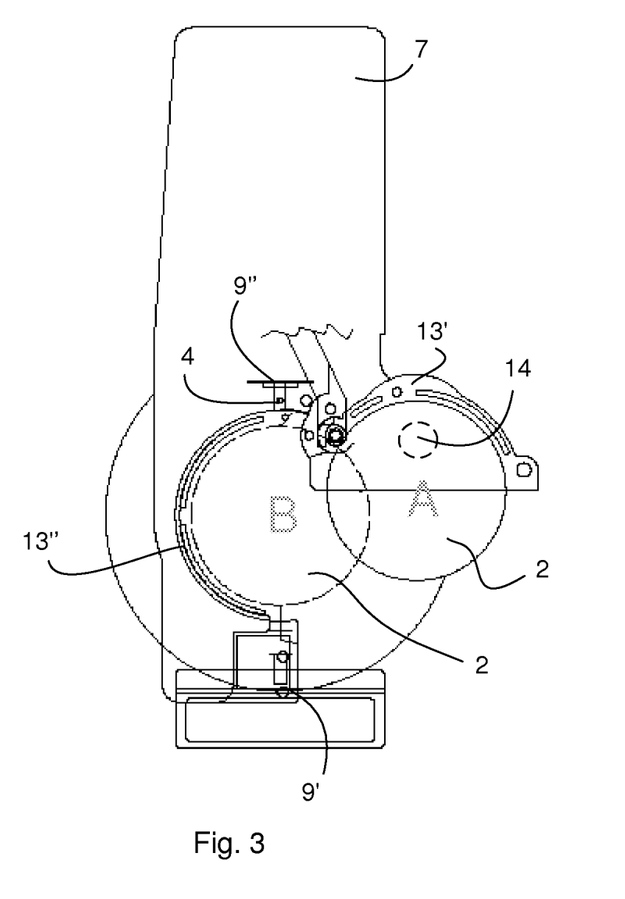
FIG. 3 shows a support frame of the device according to an embodiment of the invention in the open and closed position.
Figure 4:
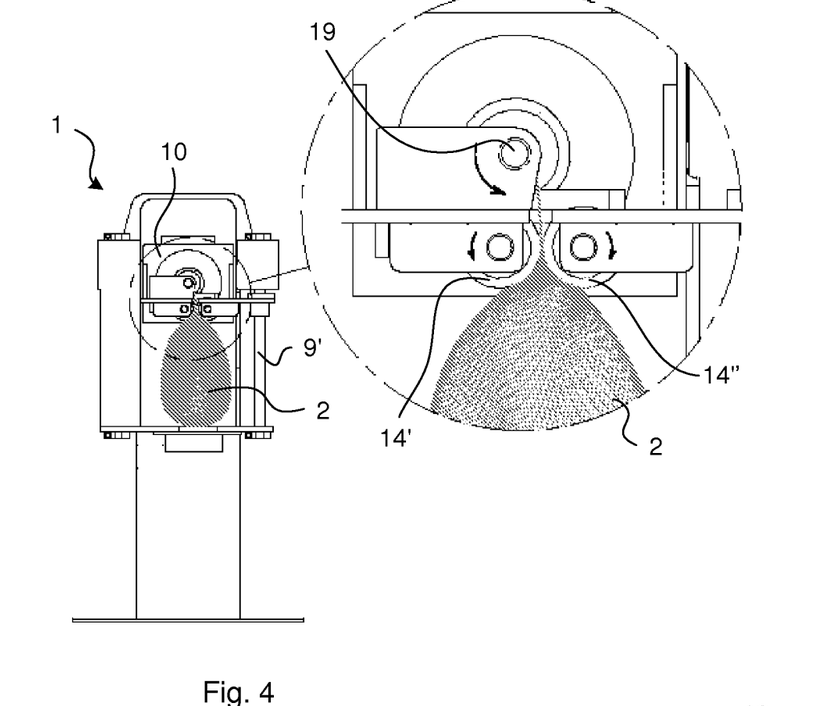
FIG. 4 shows a detailed view of pressing means according to an embodiment of the invention.

FIGS. 1 to 3 represent a device and a system according to an embodiment of the invention. FIG. 4 shows a device according to another embodiment of the invention. The same reference numbers in the individual Figures refer to the same acting components of the device.

A package 2, which has been filled up with product to be dispensed, has been arranged within a housing 7 of the device 1. An upper end 2' of the package 2 has been arranged in contact with an axle shaft 4, and a lower end 2" of the package 2 has been arranged in contact with a dispensing opening 5 of the device. The axle shaft 4 forms pressing means of the device 1 showed in FIGS. 1 and 2. The axle shaft 4 showed in FIG. 1 comprises a groove 3 in which the upper end 2' of the package has been attached. The upper end 2' of the package can comprise a short piece of a packing material above the closing seam of the package and so the package can be easily attached to the axle shaft by threading the excess packing material piece into the groove. The lower end 2" of the package can also comprise packing material in excess. The ends of the axle shaft 4 have been arranged in connection with the guide rails 9', 9" in order that the axle shaft 4 can move downwards when the package 2 is compressed.

The package is rolled around the axle shaft 4 when the package is compressed and the axle shaft is simultaneously moved downwards. The axle shaft is rotated by a regulating unit/stepper motor 10.

Cutting means 6 have been arranged to the dispensing opening 5, and they are driven with a regulating unit 11, which controls the movement of the cutting means and so the opening and the closing of the dispensing opening for dispensing a desired portion of the product. The regulating unit 11 is in data connection to the regulating unit 10 of the pressing means.

The device also comprises a Peltier element 8 for cooling or heating the product. The Peltier element has been arranged in the back part of the device in FIGS. 1 and 2, and the cooled/heated air is led into contact with the package 2 by means of a fan/fans (not shown in Figures).

The device 1 can also comprise a display 12 as shown in FIGS. 1 and 2.

FIG. 3 illustrates a support frame 13', 13" according to an embodiment of the invention viewed from above, in which support frame the package 2 is arranged in a removable manner. In an embodiment showed in FIG. 3, the support frame comprises two separate parts 13' and 13", in which case the support frame can be opened by moving the part 13' and the package 2 can be arranged inside the frame. FIG. 3 illustrates the package 2 arranged to the support frame in the open position A, and a situation B when the support frame is closed and the package 2 has been arranged in its place, so that the support frames 13', 13" surround the package 2. Between the parts 13' and 13" of the support frame there is a gap in the height direction of the support frame so that the axle shaft 4 can be moved downwards and upwards. The package 2 is opened after it has been arranged to the support frame; the package is opened in the point 14 which is in contact with the dispensing opening. In the device presented in FIG. 3, the dispensing opening is situated eccentrically in the bottom part of the frame.

FIG. 4 shows a detailed view of pressing means with a package according to another embodiment of the invention. The pressing means comprise pressing components 14', 14", i.e. at least two rollers. The device also comprises an axle shaft 19 so that the rollers 14', 14" are arranged underneath the axle shaft. The package 2 is arranged within the device 1 so that an upper end of the package is attached to the axle shaft 19 and the package is also arranged to travel through the pressing components, i.e. rollers 14', 14" before it is rolled around the axle shaft 19.

In this way, the package can be emptied evenly and the package can be rolled around the axle shaft as empty as possible.

As shown in FIG. 4, the device 1 comprises an arrangement, which comprises the axle shaft 19 and the rollers 14', 14". The arrangement is in connection with the guide rails 9' in order for moving the arrangement downwards when the package 2 is compressed. The axle shaft 19 is rotated by a regulating unit/stepper motor 10, the rollers 14', 14" are typically rotated by gravitationally.

Figure 5:
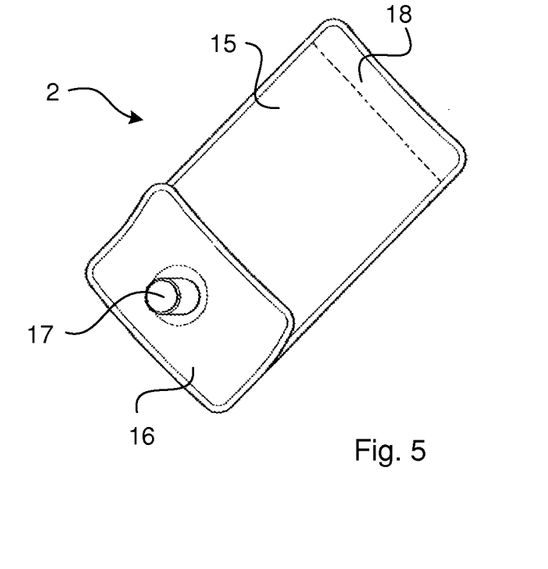
FIG. 5 shows a package to be arranged to the dispensing device according to an embodiment of the invention.

FIG. 5 shows an example of a package, which can be used in the device according to the invention. A self-standing pack 2 comprises two side walls 15, having a first end and a second end, and a base wall 16, which is connected between the first ends of two side walls. Typically, the base wall 16 comprises a ready-made opening 17, which can be arranged in connection with the dispensing opening 5 of the device 1. The package 2 can comprise a package material in excess (a non-filled area 18 in FIG. 5) in the second ends of the side walls in order that the package 2 is easy to connect pressing means of the device 1.

The figures show some embodiments in accordance with the invention. Many variations of the present invention will suggest themselves to those skilled in the art in light of the above detailed description. Such obvious variations are within the full intended scope of the appended claims.

The invention claimed is:

1. A device (1) for dispensing margarine, butter or other bread spreads in small portions, which device comprises at least
    a housing (7),
    means for arranging a package (2) in a removable manner inside the housing, said package having a first end, a second end and an outer surface, and which contains margarine, butter or other spread,
    pressing components (14', 14") comprising at least two rollers arranged towards to each other so that the package (2) is arranged to travel between the rollers, said rollers being adapted to press against the package's outer surface as the package (2) travels between said rollers, and
    a rotable axle shaft (19) separate from said rollers, and adapted to receive said second end of said package (2) and to move the package between the pressing components,
    a dispensing opening (5),
    a blade or wire (6) operable to stop a flow of margarine, butter or other spread by closing dispensing opening (5), wherein said blade or wire (6) is in data connection with said rotable axle shaft (19), such that dispensing opening (5) is closed when said margarine, butter or other spread is not being dispensed,
    wherein during operation of said device, said first end of the package is arranged in connection with dispensing opening (5) and said second end of the package is attached to said rotable axle shaft (19), such that rotable axle shaft (19) and pressing components (14', 14") move toward dispensing opening (5) as said margarine, butter or other spread is dispensed.

2. The device according to claim 1, wherein the housing of the device comprises a support frame (13', 13"), in which frame the package (2) is arranged in a removable manner, and which support frame is in contact with the package's outer surface.

3. The device according to claim 1, wherein the device (1) further comprises at least one Peltier element (8) for adjusting temperature.

4. The device according to claim 1, wherein the pressing components (14', 14") have been arranged in the housing substantially perpendicular to the height direction of the housing (7).

5. The device according to claim 1, further comprising guide rails (9', 9") arranged within the housing, which guide rails have been arranged in connection with the ends of the pressing components (14', 14").

6. The device according to claim 1, wherein the device (1) further comprises a photocell arranged close by the dispensing opening (5).

7. A system for dispensing margarine, butter or other bread spreads in small portions, wherein the system comprises
    a device (1) according to claim 1, and
    a package (2), which contains a product to be dispensed, and which package (2) has been arranged in a removable manner inside the device (1).

8. The system according to claim 7, wherein the package (2) comprises an RFID identifier, a bar code or any other identifier and the device (1) comprises a reader of the identifier.

9. The system according to claim 7, wherein the system further comprises a controlling system for adjusting and controlling a portion size of the product.

10. The system according to claim 7, wherein the system is remote controlled.

11. A method for dispensing margarine, butter or other bread spreads in small portions, wherein the method comprises
    arranging a package (2), which comprises a product to be dispensed, in a removable manner within the dispensing device (1) according to claim 1, determining the product packed in the package (2), adjusting portion size on the basis of the product, and dispensing the product by opening and closing the dispensing opening (5) of the device and compressing the package by conveying the package through the pressing components (14', 14") and simultaneously rolling up the package (2) around rotable axle shaft (19).

12. The method according to claim 11, wherein the product to be dispensed is determined and/or the portion size of the product is adjusted on the basis of the information included in an identifier attached to the package.

* * * * *